United States Patent

[11] 3,548,729

| [72] | Inventor | James G. Baker |
| | | Winchester, Mass. |
| [21] | Appl. No. | 680,621 |
| [22] | Filed | Nov. 6, 1967 |
| [45] | Patented | Dec. 22, 1970 |
| [73] | Assignee | Polaroid Corporation |
| | | Cambridge, Mass. |
| | | a corporation of Delaware |

[54] CORRECTED OPTICAL SYSTEM FOR SHALLOW CAMERA OR THE LIKE, AND COMPONENTS THEREOF
13 Claims, 4 Drawing Figs.

| [52] | U.S. Cl. | 95/36, 95/15 |
| [51] | Int. Cl. | G03b 41/10 |
| [50] | Field of Search | 95/12.5, 15, 36, 37 |

[56] References Cited
UNITED STATES PATENTS

| 3,023,662 | 3/1962 | Hicks | 352/94X |
| 3,212,420 | 10/1965 | Cierva | 95/12.5 |
| 3,229,572 | 1/1966 | Meltzer | 353/81X |
| 3,253,525 | 5/1966 | Merkel | 95/12.5 |

Primary Examiner—John M. Horan
Attorney—Brown and Mikulka and William D. Roberson ABSTRACT: A corrected optical system is provided for a shallow camera that is characterized by an extremely short dimension between the forward position of the first refracting surface and the rearward position of the final image surface. In the compact handheld camera illustrated herein as an example, the optical system is panoramic in operation, comprising (at one end of the camera) a pivotal scanning mirror and (at the other end of the camea) a slit, past which the photosensitive film is moved at a linear rate, with which the scanning mirror rate is synchronized in order to synthesize a complete image from a continuous sequence of increments.

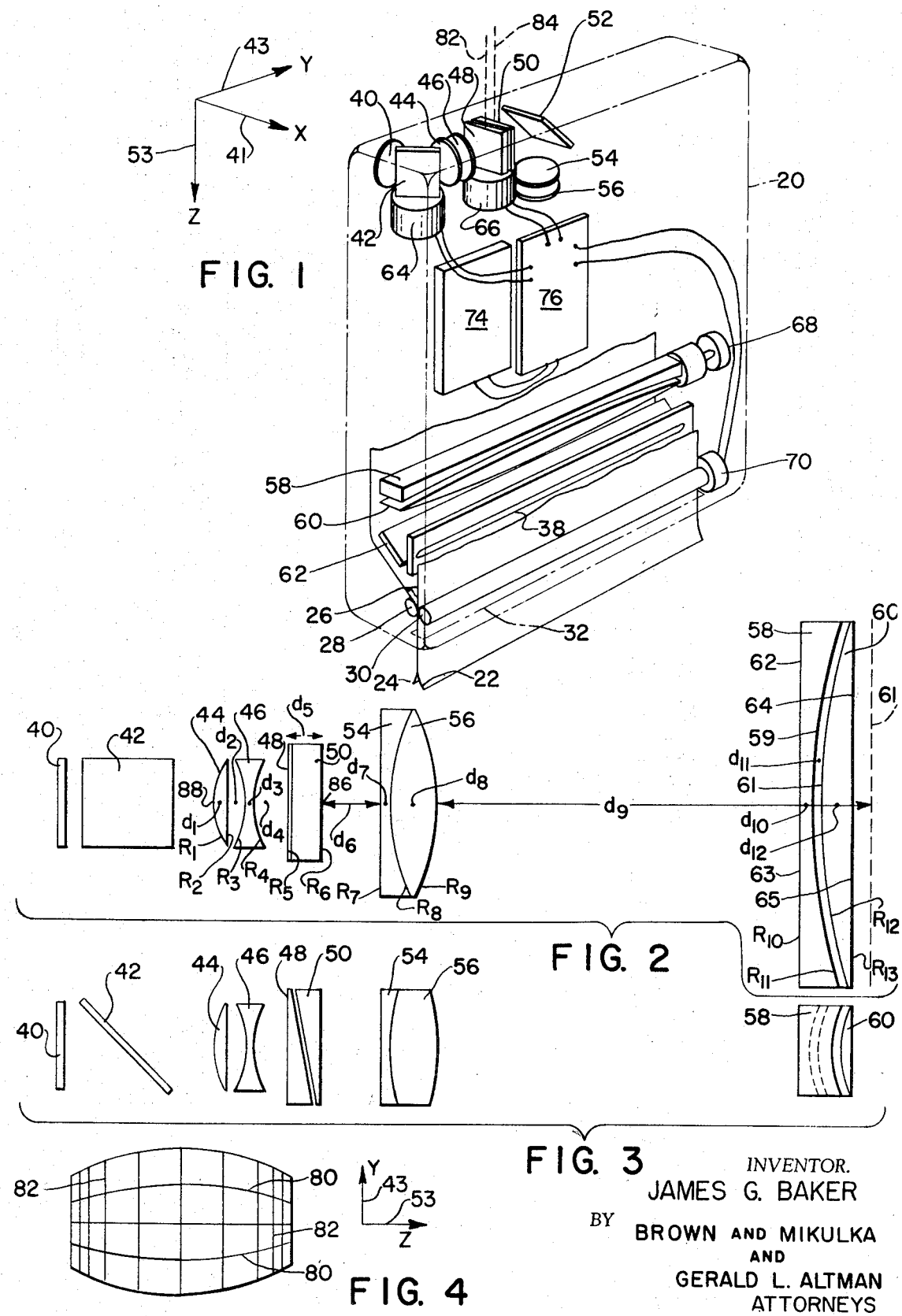

CORRECTED OPTICAL SYSTEM FOR SHALLOW CAMERA OR THE LIKE, AND COMPONENTS THEREOF

BACKGROUND AND SUMMARY OF THE DISCLOSURE

The present invention relates to photographic optics and, more particularly, to a corrected optical system for a shallow camera that is characterized by an extremely short dimension between the forward position of the first refracting surface and the rearward position of the final image surface. Such an optical system is adapted for incorporation into a hand held camera, the height and width of which are sufficiently large to accommodate a full size photographic frame that may be developed directly by diffusion transfer or the like but the thickness of which is sufficiently small to permit the camera to be carried unobtrusively in a clothing pocket or the like. Prior cameras having a like shallow front to back depth have been characterized by relatively small images because of the usually occurring relationships between lens diameter and focal length. In one type of camera incorporating a lens system of the present invention (see U.S. Pat. application Ser. No. 549,961, filed May 31, 1966, in the name of Edwin H. Land, now Pat. No. 3,405,619) the optical system is panoramic in operation. In one form, such a camera comprises (at one end of the camera) a pivotal scanning mirror and (at the other end of the camera) a slit, past which the photosensitive film is moved at a rate with which the scanning mirror rate is synchronized in order to synthesize a complete image from a continuous sequence of increments. In the design of such a compact system, it has been found that severe difficulties are encountered in attempting to compensate for perspective distortions and to achieve good image quality by correction of aberrations.

Primary objects of the present invention, for reasons that will be explained in detail below, are: to provide a corrected optical system that is adapted in one form for application to panoramic scan operation in a hand held camera characterized by an X-direction along which radiation from a field of view is received, a Y-direction with which a slit, that defines successive increments of a panoramic image, is parallel and a Z-direction with respect to which relative motion occurs between the slit and a photographic film at the image surface; to provide an optical system of the foregoing type in which an objective lens array includes a positive and a negative lens component (analogous to the first and second lens components of a Cooke triplet) for refracting light from a scanning mirror in object space in such a way as to introduce a substantially collimated flux into the remainder of the system; to provide an optical system of the foregoing type containing at least a pair of opposed prisms which pivot in synchronism and in a functional relationship with the relative motion between the slit and the photographic film to compensate for variations in off axis magnification resulting perspectively from operation of the scanning mirror; to provide a Schmidt type lens array with residual aberrations that are substantially opposite those of the objective lens array so as to combine with the objective lens array to produce excellent correction for various chromatic and seidel aberrations; and to provide adjacent to the photographic image surface a zoom lens array with low net power that permits variation in the focal length of the system by virtue of relatively movable high power components which provide appreciable sensitivity to spatial variation without destroying image quality and without movement of the critically positioned forward refracting surface and photographic image surface. Although the foregoing components are shown herein as being useful in a panoramic hand held camera, it is to be understood that certain of the specific relationships are useful in other arrangements where similar problems of aberration correction are encountered.

Other objects of the present invention will in part be obvious and will in part appear hereinafter.

The invention accordingly comprises the apparatus possessing the construction, combination of elements and arrangement in parts, which are exemplified in the following detailed disclosure, the scope of which will be indicated in the appended claims.

BRIEF DESCRIPTION OF THE DRAWINGS

For a fuller understanding of the nature and objects of the present invention, reference is made to the following detailed description, taken in connection with the accompanying drawings wherein:

FIG. 1 is a perspective view of a shallow camera incorporating a lens system embodying the present invention;

FIG. 2 is an unfolded, cross-sectional, layout view of the lens system of FIG. 1;

FIG. 3 is a view of the layout of FIG. 2, in a cross-sectional plane at right angles to that of FIG. 2; and FIG. 4 is a diagram illustrating certain principles of the present invention.

DETAILED DESCRIPTION OF THE ILLUSTRATED EMBODIMENT

Generally, the camera of FIG. 1 comprises a housing 20, shown in phantom lines, that encloses and supports the optical and photographic components. The photographic components for example include a photosensitive stratum 22 and an image receptive stratum 24, the former being constituted for advancement relative to the optical system in a manner to be described below and the latter being constituted for superposition with the latter in the presence of an interposed processing fluid 26, by operation of a pair of pressure rollers 28, 30. The resulting sandwich is ejected through a slot 32 at an extremity of the camera and the resulting picture may be stripped from the sandwich thereafter. Details of the compositions of photosensitive stratum 22, image receptive stratum 24 and processing fluid 26 are described in U.S. Pat. No. 2,543,181, issued on Feb. 27, 1951 in the name of Edwin H. Land. It will be understood that other configurations of photosensitive and receiving strata are contemplated, one such configuration specifically including the photosensitive and receiving strata in an integrated sheet.

The parts of the illustrated optical system now will be described briefly to provide preliminary comprehension of overall function and operation, as a basis for the detailed explanation to follow. As shown in FIG. 1, this system comprises: a window 40 which communicates the optical system with the objective view along an X-direction 41; a scanning mirror 42, which varies the attitude of the optical system with respect to the field of view while deflecting the optical path along a Y-direction 43; an objective lens array, including a positive lens 44 and a negative lens 46, for introducing a collimated flux to the remainder of the system; a pair of oppositely rotatable prisms 48, 50, synchronized with and functionally related to the motion of scanning mirror 42 to compensate for variations in off axis magnification from operation of the scanning mirror; a trapezoidal, plane mirror (or alternatively a totally internally reflecting prism) 52 for deflecting the optical path along a Z-direction 53; a cemented doublet 54, 56 constituting part of a Schmidt type lens array, in association with an aspheric surface at the rear of prism 50, (or alternatively at the front of prism 48), having residual aberrations that are substantially opposite those of objective lens array 44, 46 so as to combine with the objective lens array to produce excellent correction for various chromatic and seidel aberrations; a zoom lens array having a negative lens 58 and a positive lens 60, the refracting surfaces of which are disposed in proximity with a slit 38 along the Y-direction substantially throughout the width of the camera but are restricted in the direction of the X-direction and an elongated plane mirror 62 for deflecting the optical path along the X-direction to the image surface and the photosensitive stratum therein. In operation, a suitable drive 64, 66, 70 rotates scanning mirror 42, oppositely pivots prisms 48, 50 and rotates pressure rollers 28, 30 in order to advance photosensitive stratum 22 past slit 38 and spreads processing fluid 26 between photosensitive stratum 22 and print receptive stratum 24 as the sandwich formed thereby emerges from a lighttight slot 32 in housing 20. As shown, drive 64, 66, 70 includes three mechanically isolated, miniature torque motors, that are powered by a dry cell 74 under the control of a solid state circuit 76. Following a development period, conventionally ranging between 10 seconds and a minute, the photosensitive and image receptive strata are stripped apart to reveal the regular-size photographic print. The forward focal distance is variable by simply adjusting manual knob 68 which controls the positions of negative lens 46, cemented doublet 54, 56 and zoom lens elements 58, 60. The mountings which establish these positions are connected by a suitable linkage (not shown). A shutter (not shown) at window 40, in one form, assists scan mirror 42 in excluding undesired light from within the camera housing and a closure (not shown) at the back of the camera housing enables reloading thereof conveniently.

The structure and function of the components of the lens system now will be described in detail.

Objective Lens Group 44, 46 and Correcting Prisms 48, 50

Although the depth of the illustrated camera from forward refracting surface to rearward focal plane is unusually shallow, the lens system axially is unusually long for its focal length. The manner in which this unusual length is achieved will be described below. The reasons for this unusual length are the specified depth of the housing as being less than one inch, the specified position of the entrance window as being located at the upper left hand corner as the user sees it from behind, the specified use of transfer diffusion photographic materials, the specified choice of a fixed image size and position which, for infinite object distance, corresponds to an approximately 5-inch focal length (for a wide range of object distances), the space needed for diagonal sweep mirror 42, the space needed for trapezoidal mirror 52, the space needed for elongated mirror 62 and the specified slit position.

A panoramic camera of the type disclosed introduces a number of problems not ordinarily encountered in snapshot photography. For example, in the present case, photosensitive stratum 22 is to be moved at a constant rate past slit 38 while lying in a plane at right angles substantially with respect to original X-direction 41. Ordinarily, a flat field lens system produces an image on a photosensitive stratum at the focal plane. However, in the present case, when the field of view is scanned by such means as diagonal sweep mirror 42, in the meridional plane, the image rate is exactly that of the photosensitive stratum rate only at the center of the slit. With a reasonably narrow slit width, in the present case a maximum of 0.4 inches, there is a slight but acceptable blurring which is caused by the slight difference between the positions of points along an arcuate cylindrical surface defined by the scan mirror about its axis and the corresponding positions of points along a plane that would be defined by the operation of the lens system itself. Along the length of slit, it obviously is necessary that the optical design produce a flat image in the Z-direction and that the distortion over the full length of the slit be held to say ± 1 percent of the mean value adopted for the entire panoramic image. To this extent, the optical design for this panoramic camera becomes similar to that of a snapshot camera. However, a snapshot camera would require a wider field inasmuch as the diagonal of a square image, for example, would be 1.4 times the length or width of the image. The optical design of the contemplated panoramic camera need only cover the width of the image since the length is generated by the scanning operation, and no diagonal dimension is encompassed by the optical system. The optical system is shown in FIG. 2 as being unfolded along a single axis for ease of explanation.

As shown in FIG. 2, the objective lens array includes window 40, scanning mirror 42, positive lens element 44 and negative lens element 46. By design, for an adopted mean object distance of 25 focal lengths, the rays emerging from negative lens element 46 are nearly or accurately parallel in order to minimize aberrations that would otherwise result on transmission through correcting prisms 48, 50 to be described in detail below. Although strict parallelism could be obtained by the use of an aspheric surface forwardly of prism 48, it is not essential owing to reasonable tolerances permitted by the operating parameters of the illustrated optical system, namely a 5-inch focal length, an f/8 speed and a 45 line pair per millimeter resolution, which are appropriate for good hand photography. It is to be understood that prisms 48, 50 may be positioned at positions along the axis other than the positions shown without change in principle of operation.

Prisms 48, 50 are provided in response to the fact that a panoramic camera causes the image to contain a distorted perspective for normal purposes, namely, that which a pinhole camera would produce on a strip of film lying on a right circular cylindrical surface centered at the pinhole. As shown in FIG. 3, in a panoramic camera, a grid or reseau in object space projects into a planar array where the previously straight horizontal lines become curved as at 80 toward the meridional plane of the scanned picture from above and below, the amount of the curvature depending on the cosine of the off-axis angle. The vertical grid lines in object space remain vertical as at 82 but are compressed on either side of the axis toward a central line by an amount depending on the cosine square of the field angle, insofar as the magnification locally is concerned, but by a displacement proportional to the difference of the tangent and the arc of the angle insofar as the actual absolute displacement is concerned. The present optical system is intended to compensate for this cylindrical projection error by means both of a "zoom" action depending on the off-axis angle, as will be described below, and by a pivoting of prisms 48, 50. Prisms 48, 50 are introduced here in order to obtain a variable angular magnification in the meridional plane of the lens system. Parallel light refracted through such a prism pair at so-called minimum deviation, where each of the prisms refracts in an opposite sense with respect to the other, emerges accurately parallel and with unchanged magnification of the angular subtense of any object viewed in the beam. That is to say, if one looked through the prism pair at a distant object for example, no change in apparent size would be observed. The function of the prisms is to cause refraction to occur away from the minimum deviation but through each prism equally and oppositely so that the emergent light will remain parallel but so that the angular subtense of any distant object viewed through the prism pair will be altered by a calculable amount. It is essential that the prisms be arranged to produce equal and opposite refractions in order that no lateral color dispersion be introduced into the emergent beam. That is, entering white light must emerge as white light, undispersed.

Prism pair 48, 50 is at minimum deviation at the center of the scan, that is, for the center strip of the panoramic picture. Off center, progressively, the prism pair produces in an angular sense a requisite change in magnification that combines with the following components of the optical system to yield a magnified image at slit 38 which by design becomes a single cosine correction factor in the meridional plane of the scan. Thus, the cosine square error is reduced to a single cosine error to match the remaining single cosine error in the direction perpendicular to the direction of movement of the photosensitive stratum.

Prisms 48, 50 must operate in parallel or nearly parallel light in order not to introduce additional astigmatism into the optical image at the beginning or end of the scan. At minimum deviation for the center of the field, there is no appreciable astigmatism and would be none even if the light were not parallel. The prisms pivot about axes 82, 84 by equal and opposite amounts from their positions at the center of the field midpoint of the scan action) where they are at minimum deviation.

It should be noted that in such a prism pair arrangement, full symmetry necessarily is lacking. The reason for the slight assymetry is that, although the required image enlargement both at the beginning and end of the scan is achievable as described, the following factors contribute to the final effect. It is true that the prism pair at the beginning and at the end of the scan occupy positions analogously away from the minimum deviation. However, the rate of change, across increments (as determined by the width of slit 38) of the field being scanned, is increased at the initial or final increments of the image and is decreased at oppositely located increments of the image depending on which of the two relative pivotal relationships for pair of prisms 48, 50 is selected. For a narrow slit of the type herein contemplated, say 0.4 inch in maximum width, the problem is well within acceptable limits. For a wide slit, there might be no additional blurring action one side of center but a double blurring action on the other side. In one alternative form of the invention, such blurring with a relatively wide slit is eliminated by a second prism pair, the motions of which are opposite corresponding motions of the first prism pair. Also, in alternative forms of the optical system, prisms 48, 50 are moved either to a position immediately preceding positive lens 44 or to a position immediately preceding sweep mirror 42, without change in function. In another alternative form of the present embodiment, objective lens array 44, 46 is pivoted about a point on the optical axis appropriately between lens 44 and lens 46 to obtain additional outward distortion off-axis as a function of scan angle in order further to compensate the cylindrical projection aberrations.

Schmidt Lens Array 54, 56 and Asperic Surface $R_6$

With reference now to Schmidt type lens array 54, 56, it will be recalled that the so-called Schmidt optical system employs two principles. The first is that of symmetry of reflecting or refracting surfaces about a center of curvature. The second is that of positioning a correcting surface at the center of curvature to remove spherical aberration over a wide field of view. In the present Schmidt arrangement, the indices of refraction of cemented elements 54, 56 are either identical at a mean wave length or so nearly so that residual aberrations are acceptable for the photography to be achieved. The initial surface of lens 54 is taken to be plano or sufficiently so that the residual aberrations are acceptable. Under these conditions, the center of curvature of the rear surface of lens 56 is taken to lie by refraction at the rear vertex of prism 50. If one were to put an artificial star point as a source of light at this rear vertex 86, the rays after refraction through lenses 54, 56 in a mean wavelength, would emerge as radii of the rear spherical surface of lens 56. To complete the Schmidt lens arrangement, the rear surface of prism 50 is aspheric in such a way as to produce a sharply focused axial image at the final image plane of the system for the full $f/8$ beam. Even though prism 50 rotates about axis 84 which is through vertex 86, the aspheric is so weak optically that no harmful aberrations are introduced into the final image. As indicated above, in an alternative embodiment the aspheric surface and the center of curvature are at the front face of prism 48. In another alternative embodiment, prisms 48, 50 are replaced by a substantially plane parallel element, one or both of the surfaces of which are aspheric.

Schmidt type lens array 54, 56, together with its associated aspheric surface at 86, comprise a well corrected optical system except for some curvature of field, a large inward or barrel distortion and some color aberration. Similarly, objective lens array 44, 46 is an equally well corrected optical system but with opposite curvature of field, an outward or pincushion distortion and opposite color aberration. The two arrays in tandem thus produce a flat image with acceptably small net distortion and with entirely adequate color correction including longitudinal, lateral and chromatic variations of the seidel aberrations. It will be noted from the drawing that the optical system is physically quite long for its focal length. In one form of the illustrated embodiment, as shown, the overall length from the front surface of lens 44 to the final image plane is 6.487 inches, whereas the focal length is 5 inches. Some of the physical length of the illustrated system has been obtained by use of the Schmidt array, inasmuch as a Schmidt system is quite long for its focal length even as a separate system.

Specific Example Illustrating Combination of Objective Lens Array 44, 46, and Schmidt Lens Array 54, 56

The specific example of the following table lists representative numerical values for the radii, thicknesses, indices of refraction and Abbe numbers of an optical system of the foregoing type, including lenses 44, 46, prisms 48, 50 and lenses 54, 56. Elements 58, 60, which are not necessary to the optical system of the following specific example, will be described later. As indicated above, in the following system, the focal length $= 5$ inches, the side-to-side field angle $= 38°$ and the speed is $f/8$.

TABLE I

| Lens, prisms or airspace | Radius | Thickness and spacing | Index of refraction, $n_d$ | Abbé Number, $v_d$ |
|---|---|---|---|---|
| 44 | $R_1 = 1.1590 \pm .0005$ | $d_1 = 0.135 \pm .002$ | 1.691 | 54.7 |
| Airspace | $R_2 = 5.683 \pm .005$ | $d_2 = 0.1656$ | | |
| 46 | $R_3 = -2.1970 \pm .0013$ | $d_3 = 0.045 \pm .0015$ | 1.573 | 42.6 |
| Airspace | $R_4 = +0.9903 \pm .0006$ | $d_4 = 0.100$ | | |
| 48, 50 | $R_5 = $ Plano | $d_5 = 0.250 \pm .0005$ | 1.803 | 46.8 |
| Airspace | $R_6 = $ Plano | $d_6 = 1.500$ | | |
| 54 | $R_7 = $ Plano | $d_7 = 0.050 \pm .002$ | 1.626 | 35.7 |
| 56 | $R_8 = +3.747 \pm .004$ | $d_8 = 0.225 \pm .002$ | 1.641 | 60.1 |
| | $R_9 = -2.7565 \pm .0015$ | $d_9 = 4.016$ | | |

When two optical systems that are separately corrected are placed in tandem, additional degrees of freedom for the alignment are introduced, particularly if the intervening axial bundle is of parallel light, as here. The first system can be displaced along the axis, or rotated, or displaced laterally. It will be recalled that as the stages of optical design proceed toward a more highly corrected image, the optical system becomes increasingly less dependent on the choice of the position of the entrance pupil (and therefore of the exit pupil). In the limit if the entering light is parallel and the emergent light is not only strictly parallel but has angular magnification (as in a telescope), the position of the pupil becomes relatively unimportant. In the case of two such systems in tandem, the exit pupil of the first can be regarded as the entrance pupil of the second. If neither is sensitive to the position of the pupil, it follows that the positioning of the first optical system relative to that of the second allows some freedom. In the system at hand, the separate field and Schmidt groups actually are not fully corrected but they are sufficiently well corrected to allow some freedom of relative movement. For example, objective lens group 44, 46 is corrected for spherical aberration, coma and astigmatism for a rear stop, but do have a strongly negative (overcorrected) curvature of field. Schmidt group 54, 56, $R_6$ also is free of spherical aberration, comma and astigmatism but has strongly positive (undercorrected) curvature of field. The off-axis wave fronts therefore are divergent and convergent in the two systems but otherwise are stigmatically corrected. Matching these curvatures of the wave fronts results in a net flat field for the overall system, notwithstanding relative movement of the systems laterally or longitudinally. In one modification of the illustrated embodiment, this freedom allows the option of using "zoom" action to obtain focus and any reasonable variation desired in focal length.

It should be noted that in the illustrated optical system, longitudinal and lateral color aberration have been eliminated much as it is accomplished in the case of the ordinary triplet. Because of the large air spaces, however, and because of the need to minimize the residual color aberrations, while adjusting for required location the Schmidt component has incorporated a cemented doublet instead of a single element.

Zooming Without Zoom Lens Array 60, 62

In the illustrated optical system, if zoom lens array 60, 62 is not considered, there are four air spaces $d_2$, $d_4$, $d_6$ and $d_9$. Inasmuch as prism pair 48, 50 has no appreciable optical power, $d_4$ and $d_6$ do much the same thing and can be regarded as a single parameter. Moreover, it will be recalled that the center of curvature of the Schmidt group is at 86, a condition which exists only if $d_6$ is held fixed. Nevertheless, in an alternative form of the illustrated embodiment, longitudinal motions in $d_6$ of ± 0.5 inches can be tolerated when it is desirable to move only the cemented doublet and to omit prism pair 48, 50. The three effective parameters, namely $d_2$, $d_4 + d_6$ and $d_9$, under these circumstances, allow compensation for focal position, focal length and some third order aberrations in order to offset changes caused either by focusing for different object distances or for zooming the focal length to obtain the required correction for the remaining single cosine factor in Y and Z direction, or both. Although, in various modifications of the illustrated embodiment, synchronized movements involving these three parameters are contemplated for zooming focal length in one form and for aberration compensation in another form, as is to be expected with only 3 free parameters, the aberrations become significant outside a rather narrow range of focus.

An additional desired feature is that the sweep action of the scan mirror should be the same regardless of object distance. In other words, where mechanical simplicity is paramount, it is desired that only a single mechanical or electromechanical movement be utilized for the scan action and that the focusing for different object distances be accomplished separately. This requires that the image size and position, both as a function of scan and as a function of object distance, remain the same by zooming of the air spaces for any usable object distance. For a pure zoom system utilizing only longitudinal movements of the components, only the air spaces are available as parameters and indeed only through ranges that are permitted by the mechanical details of the camera and by noninterference of one element with another. In the panoramic system under consideration, the air space between sweep mirror 42 and forward vertex 88 of lens element 44 is held constant to prevent contact with mirror 42. In the illustrated system, as mentioned earlier, the only free parameters are $d_2$, $d_4 + d_6$ and $d_9$. If vertex 88 is to remain fixed, then lens element 44 is fixed. Therefore, only lens element 46 moves, inasmuch as prism pair 48, 50 must not move longitudinally. As a consequence, the increment of movement in space $d_4$ is always the negative of the corresponding increment of movement in space $d_2$. Similarly, if Schmidt lens group 54, 56 moves, the associated increment of movement in space $d_9$ is equal to the negative of the corresponding increment of movement in space $d_6$. Thus there actually are only two free parameters when the overall length is held fixed and only two components are moved. In a modification of the illustrated embodiment that omits zoom lens array 58, 60, these two free parameters are adjustable in such a way as to hold image size and position at desired values for any reasonable object plane distance and for magnification changes needed during the sweep to produce the necessary zooming and perspective changes in the photograph.

It will be recalled that during the sweep action of mirror 42, a single cosine factor must be obtained to compensate for loss of local magnification in the related cylindrical projection along the Y and Z directions. (Prism pair 48, 50 compensates for the additional cosine factor in the Z-direction). This single cosine factor is obtained by a calculated change in the "scale" at the particular off axis angle of the instant. This change in scale must be accompanied by holding the focus at image plane 61. The 2 free parameters above discussed then may be determined by solving the necessary equations by iteration. Since the relationships also are a function of object distance, a double entry of spacings versus object distance, where image size and position are held independent of object distance.

In the following table, the lens system has, at null position, a 5-inch table focal length and an object distance of 25 focal lengths (10 feet 5 inches). In one form, the total picture scan time is one-third second.

TABLE II
1./s. (Reciprocal Object Distance)

| Spacing | .00 | .01 | .02 | .04 | .08 | .16 | .32 |
|---|---|---|---|---|---|---|---|
| $\Delta d_2$ | −.0255 | −.0193 | −.0131 | .0000 | .0290 | .0963 | .1792 |
| $\Delta d_4$ | .0255 | .0193 | .0131 | .0000 | .0290 | −.0963 | −.1792 |
| $\Delta d_6$ | −.1276 | −.0978 | −.0669 | .0000 | .1658 | .5992 | .7535 |
| $\Delta d_9$ | .1726 | .0978 | .0669 | .0000 | −.1658 | −.5992 | −.7535 |
| $\Delta d_2$ | −.0310 | −.0251 | −.0191 | −.0068 | .0198 | .0882 | .1710 |
| $\Delta d_4$ | .0310 | .0251 | .0191 | .0068 | −.0198 | −.0882 | −.1710 |
| $\Delta d_6$ | −.1985 | −.1718 | −.1441 | −.0854 | .0510 | .5002 | .6580 |
| $\Delta d_9$ | .1985 | .1718 | .1441 | .0854 | −.0510 | −.5002 | −.6580 |
| $\Delta d_2$ | −.0444 | −.0390 | −.0336 | −.0225 | .0006 | .0522 | .1685 |
| $\Delta d_4$ | .0444 | .0390 | .0336 | .0225 | −.0006 | −.0522 | −.1685 |
| $\Delta d_6$ | −.3765 | −.3549 | −.3330 | −.2875 | −.1887 | .0588 | .6531 |
| $\Delta d_9$ | .3765 | .3549 | .3330 | .2875 | .1887 | −.0588 | −.6531 |
| $\Delta d_2$ | −.0611 | −.0562 | −.0513 | −.0412 | −.0206 | .0232 | .1284 |
| $\Delta d_4$ | .0611 | .0562 | .0513 | .0412 | .0206 | −.0232 | −.1284 |
| $\Delta d_6$ | −.6076 | −.5905 | −.5730 | −.5373 | −.4627 | −.2960 | .1917 |
| $\Delta d_9$ | .6076 | .5905 | .5730 | .5373 | .4627 | .2960 | −.1917 |

The tabulation shows that the movement of lens element 46 is comparatively small, a consequence of the strong optical powers of first and second lens element 44, 46. The longitudinal movement of Schmidt group 54, 56 is quite large, amounting to more than half an inch at the beginning and end of the picture scan, at the mean focal distance, and to more than three-fourths inch, for the on-axis requirement at an object distance of 15-⅝ inches. Since most hand cameras focus only to about 3 feet for a 5 inches focal length, the achieved result here is unusual. The movement is executed twice during the scan, the center being the mean position. For the object distance of 25 focal lengths, the displacement of Schmidt group 54, 56 averages 0.5373 in one-third second or 1.6 inches/second. The actual movement is nonlinear, however, and is of a quadratic nature resulting from the first variable term in the expansion of the cosine.

Zoom Lens Array 60, 62

It is obvious that in the embodiment above described, with only two free parameters, most versatile control cannot be exercised over the variations in the aberrations such as longitudinal and lateral color, spherical aberration, coma, astigmatism and distortion. (Many zoom systems employ achromatized components to minimize the variations in color correction with zooming. In this respect, any variation in lateral color usually is more serious than the one in longitudinal color and can preclude acceptable wide angle performance). In the illustrated embodiment, in order to obtain additional free parameters, zoom lens array 58, 60 has been introduced. Normally, one would design a system of this type to make maximum use of all the new parameters (four radii of curvature, two thicknesses, one central air space if not cemented, possible aspheric surfaces, two indices of refraction and two v-values.) In the present embodiment, however, it is desired to achieve a wide zooming range without upsetting previously described performance. Zoom lens array 58, 60 is such that its external surfaces 62, 64 are substantially plano. Outer surfaces 54, 56 are either plano or have like large radii of curvature so that they have small net coma and astigmatism and possibly some spherical aberration and curvature of field. Inner surfaces 59, 61, which are substantially identical, are large enough to encompass the maximum dimension of the image. The longitudinal color that is generated by zoom lens group 58, 60 is slightly overcorrected but tolerable at f/8/0. In an alternative embodiment, the negative and positive zoom lenses are positioned more closely to the Schmidt lens array, with outer surfaces of the zoom lenses constituting a shell having a radial center substantially concentric with the Schmidt lens surface and inner surfaces that are substantially aplanatic.

In one form, lenses 58, 60 are composed of lanthanum crown glass having an index of refraction of 1.691 and a v-value of 54.7. The high v-value minimizes the color aberration introduced into the system. The high index of refraction, which need not fall within critical tolerances, for a given total thickness of lenses 58, 60 taken together, provides great optical power in a small physical space and in turn minimizes mechanical movement in the zoom operation.

The following radii and thicknesses of lenses 58, 60 are typical.

TABLE III

| Lens or airspace | Radius | Thickness and spacing |
|---|---|---|
| 58 | $R_{10}$=plano | $d_{10}$=0.125±0.010 |
| Airspace | $R_{11}$=+3.333 | $d_{11}$=.3250± variable |
| 60 | $R_{12}$=+3.333 | $d_{12}$=0.650±0.010 |
| | $R_{13}$=plano | $d_{13}$=.6322 |

In the illustrated embodiment, lenses 58, 60 are movable. Thus, the movable lens elements are lens 46, cemented doublet 54, 56 and lenses 58, 60, the variable air spaces thereby being $d_2$, $d_4$, $d_6$, $d_9$, $d_{11}$ and $d_{13}$. As was indicated before, the increment in $d_4$ remains the negative of the increment in $d_2$, the increment in $d_{11}$ affects the increment in $d_9$ and the increment in $d_6$ affects the increment $d_9$.

In the following table, for a 0.04 reciprocal object distance, lens element 58 remains essentially at null. Like the optical system of table II, the system has an approximately 5 inch focal length and an object distance of 25 focal lengths (10 feet 5 inches) at null position. In one form the total picture scan time is two-thirds second.

TABLE IV

1./s. (Reciprocal Object Distance)

| Spacing | .00 | .01 | .02 | *.04 | .08 | .16 | .32 |
|---|---|---|---|---|---|---|---|
| $\Delta d_2$ | −.0130 | −.0098 | −.0066 | .0000 | .0137 | .0434 | .1152 |
| $\Delta d_4$ | .0130 | .0098 | .0066 | .0000 | −.0137 | −.0434 | −.1152 |
| $\Delta d_6$ | .0093 | .0067 | .0043 | .0000 | −.0052 | .0005 | .1069 |
| $\Delta d_9$ | .0378 | −.0282 | −.0186 | .0000 | .0337 | .0833 | .0739 |
| $\Delta d_{11}$ | .0586 | .0441 | .0294 | .0000 | −.0589 | −.1751 | −.3841 |
| $\Delta d_{13}$ | −.0301 | −.0226 | −.0151 | .0000 | .0304 | .0913 | .2033 |
| $\Delta d_2$ | −.0125 | −.0093 | −.0061 | .0004 | .0139 | .0431 | .1138 |
| $\Delta d_4$ | .0125 | .0093 | .0061 | −.0004 | −.0139 | −.0431 | −.1138 |
| $\Delta d_6$ | .0035 | .0006 | −.0022 | −.0072 | −.0142 | −.0125 | .0834 |
| $\Delta d_9$ | −.0474 | −.0374 | −.0276 | −.0083 | .0273 | .0812 | .0826 |
| $\Delta d_{11}$ | .0918 | .0773 | .0627 | .0334 | −.0256 | −.1420 | −.3522 |
| $\Delta d_{13}$ | −.0479 | −.0405 | −.0330 | −.0179 | .0124 | .0733 | .1862 |
| $\Delta d_2$ | −.0110 | −.0079 | −.0048 | .0014 | .0143 | .0422 | .1095 |
| $\Delta d_4$ | .0110 | .0079 | .0048 | −.0014 | −.0143 | −.0422 | −.1095 |
| $\Delta d_6$ | −.0134 | −.0171 | −.0208 | −.0278 | −.0400 | −.0495 | .0159 |
| $\Delta d_9$ | −.0753 | −.0646 | −.0540 | −.0327 | .0083 | .0743 | .1078 |
| $\Delta d_{11}$ | .1886 | .1743 | .1600 | .1307 | .0717 | −.0456 | −.2600 |
| $\Delta d_{13}$ | −1.000 | −.0926 | −.0851 | −.0701 | −.0399 | .0208 | .1363 |
| $\Delta d_2$ | −.0090 | −.0060 | −.0031 | .0029 | .0150 | .0409 | .1027 |
| $\Delta d_4$ | .0090 | .0060 | .0031 | −.0029 | −.0150 | −.0409 | −.1027 |
| $\Delta d_6$ | −.0413 | −.0460 | −.0506 | −.0599 | −.0780 | −.1054 | −.0874 |
| $\Delta d_9$ | −.1152 | −.1039 | −.0926 | −.0697 | −.0239 | .0616 | .1474 |
| $\Delta d_{11}$ | .3405 | .3266 | .3125 | .2840 | .2257 | .1063 | −.1175 |
| $\Delta d_{13}$ | −.1839 | −.1767 | −.1693 | −.1544 | −.1237 | −.0625 | .0574 |

*The reciprocal object distance 0.04 has been taken as the mean value and the table above gives the displacements in inches from the null spacings for 0.04 on-axis.

In taking advantage of the possibilities introduced by the additional free parameters afforded by zoom lens elements 58, 60, improved performance is permitted by requiring a minimization of the sum of the squares of the weighted changes in the aberrational coefficients of longitudinal color, lateral color, spherical aberration, coma and astigmatism. The iterative solution thus cannot be compared directly with that of table II, it being expected that the air space changes generally will be smaller in every case. However, a comparison of tables II and IV with respect to magnitude of air space changes makes it apparent that for object distances including and greater than 25 focal lengths, only modest changes of air space occur in table IV even at close object distances.

In the illustrated system, if inner surfaces 59, 61 were truly aplanatic in the case where zoom lenses 58, 60 are as close to the image plane as shown, they would be too curved to admit the required field of view in the Z-direction. However, as zoom lenses 58, 60 are moved closer to the image plane, the relative height of the paraxial on-axis ray becomes rapidly smaller. This means that spherical aberration, coma and astigmatism become smaller and smaller anyway, regardless of whether inner surfaces 59, 61 remain aplanatic or not. It should be realized that spherical aberration, coma and astigmatism a plano-plano optical plate in the rear image space are independent of the position of the plate in this rear image space. That is to say, if one introduces a thick plate into the rear air space of an already designed optical system, the three aberrations then introduced as a consequence of the thickness of the plate have the same computed values regardless of the location. In view of the foregoing, zoom lenses 58, 60 are designed with outer surfaces 59, 61 plano because the associated minor aberrations can be tolerated and with inner surfaces 63, 64 arbitrarily and analogously negative and positive respectively to approach at least to some extent the aplanatic condition. As shown, the common radius of inner surfaces 63, 65 is such as to permit about a half-inch variation in thickness of either element, with a small uncemented central air space there between.

TABLE V

The null spacings are:

| | |
|---|---|
| $d_2$ | 0.1656 |
| $d_4$ | .1000 |
| $d_6$ | 1.5000 |
| $d_9$ | 2.7369 |
| $d_{11}$ | .3250 |
| $d_{13}$ | .6322 |

The four decimals are given to prevent approximation errors but tolerances are quite normal. The overall length from the front surface of lens element 44 to the image plane is fixed at 6.940 inches throughout the movement. The scale in the image plane is so adjusted that the sweep action is the same regardless of the object distance although the sweep rate varies across the field, always in the same way. For zero air space air space the pair constitute merely a thick plate interpolated into the beam. However, the null air space has been taken as 0.3250 inches to allow for plus and minus variations. The focus now extends from infinity to the 0.16 column in table IV without encountering negative air space

CONCLUSION

The foregoing disclosure thus provides a novel prism arrangement for minimizing off axis perspective distortion in a panoramic system, a novel Schmidt arrangement for correcting aberrations encountered in an associated objective lens arrangement and a novel zoom lens arrangement in contiguity with a focal surface. These arrangements are useful in themselves as well as in connection with a shallow handheld camera of the type illustrated by way of example. Since certain changes may be made in the above disclosure without departing from the scope of the present invention, it is intended that all matter shown in the accompanying drawing and described in the foregoing specification be interpreted in an illustrative sense.

I claim:

1. A handheld shallow camera having a depth that permits it to be readily carried in a clothing pocket and a width and length that permits the generation therein of an image of snapshot size for development by transfer diffusion, said camera being characterized by an X-direction along which radiation from a field of view is received, a Y-direction along which is oriented a slit that defines successive increments of a panoramic image and a Z-direction along which relative motion occurs between the slit and a photosensitive stratum at the image surface, said camera comprising a scanning mirror for varying the attitude of the remainder of the optical system with respect to the field of view, an objective lens array including positive lens means and a negative lens means for refracting light from said scanning mirror in such a way as to introduce a substantially collimated flux into the remainder of said optical system, at least a pair of opposed prisms which pivot in synchronism with said relative motion between said slit and said photosensitive stratum in order to compensate for variations in off axis magnification, a Schmidt type lens array with residual aberrations that are substantially opposite those of said objective lens array so as to combine with said objective lens array to produce correction for various chromatic and seidel aberrations and a zoom lens array contiguous with said image surface, said zoom lens array including forward negative lens means and rearward positive means, said movement of said scanning mirror, said movement of said opposed prisms and said relative movement between said slit and said photosensitive stratum being synchronized to photoexpose said photosensitive stratum to said panoramic image.

2. The camera of claim 1 wherein at least one surface of said opposed prisms is substantially perpendicular to said Y-axis and is an aspheric.

3. The camera of claim 2 wherein the center of curvature of the final surface of said Schmidt type lens array is taken to lie by refraction at the vertex of said aspheric.

4. The camera of claim 1 wherein said negative lens means and said positive lens means of said Schmidt type lens array constitute a partially achromatized pair.

5. The camera of claim 1 wherein means are provided to move said negative lens means of said objective lens array, said lens means of said Schmidt type lens array and at least one of the lens means of said zoom lens array in synchronism to adjust image size and position.

6. The camera of claim 1 wherein said objective lens array and said Schmidt type lens array are characterized by substantially equal and opposite curvatures of field.

7. The camera of claim 1 wherein the lenses of said zoom lens array are characterized by opposed outer surfaces that are substantially plano and adjacent inner surfaces that are analogously divergent and convergent.

8. The camera of claim 1 wherein the internal surfaces of said zoom lens array are of relatively strong power, individually and of relatively low power combined.

9. A handheld shallow camera having depth that permits it to be readily carried in a clothing pocket and a width and length that permits the generation therein of an image of snapshot size for development by transfer diffusion, said camera being characterized by an X-direction along which radiation from a field of view is received, a Y-direction along which is oriented a slit that defines successive increments of a panoramic image and a Z-direction along which relative motion occurs between the slit and a photosensitive stratum at the image surface, said camera comprising a scanning mirror for varying the attitude of the remainder of the optical system with respect to the field of view, an objective lens array including a positive lens component and a negative lens component for refracting light from said scanning mirror in such a way as to introduce a substantially collimated flux into the remainder of said optical system, at least a pair of opposed prisms which pivot in synchronism with said relative motion between said slit and said photosensitive stratum in order to compensate for variations in off axis magnification, a Schmidt type lens array with residual aberrations that are substantially opposite those of said objective lens array so as to combine with the objective lens array to produce correction for various chromatic and seidel aberrations, and a zoom lens array including a forward negative lens component and a rearward positive lens component, one surface of said opposed prisms being substantially perpendicular to said Y-direction and being an aspheric, the center of curvature of the final surface of said Schmidt type lens array being taken to lie at the vertex of said aspheric, said negative lens of said objective lens array, said Schmidt type lens array and at least one of the lens components of said zoom lens array being movable in synchronism, whereby said movement of scanning mirror, said movement of said opposed prisms and said relative movement between said slit and said photosensitive stratum are synchronized to photoexpose said photosensitive stratum to said panoramic image.

10. The camera of claim 9 wherein the remote refracting surfaces of said zoom lens array have relatively weak power and the contiguous refracting surfaces of said zoom lens array have relatively strong power.

11. The camera of claim 9 wherein the contiguous surfaces of said zoom lens array are substantially aplanatic.

12. The camera of claim 9 wherein movement of the components of said zoom lens array causes change of focal position.

13. The camera of claim 9 wherein movement of the components of said zoom lens array causes change of image size in a given image surface.